United States Patent [19]

Chaverot et al.

[11] Patent Number: 5,120,777

[45] Date of Patent: Jun. 9, 1992

[54] BITUMEN/POLYMER COMPOSITION EXHIBITING AN ADHESIVENESS WHICH IS RETAINED ON STORAGE AT ELEVATED TEMPERATURE AND PROCESS FOR PREPARING SUCH A COMPOSITION

[75] Inventors: Pierre Chaverot, Oullins; Jean-Pascal Planche, Lyons, both of France

[73] Assignee: Elf France, Courbevoie, France

[21] Appl. No.: 655,426

[22] PCT Filed: Jun. 29, 1990

[86] PCT No.: PCT/FR90/00483

§ 371 Date: Feb. 22, 1991

§ 102(e) Date: Feb. 22, 1991

[87] PCT Pub. No.: WO91/00315

PCT Pub. Date: Jan. 10, 1991

[30] Foreign Application Priority Data

Jun. 30, 1989 [FR] France .................. 89 08768

[51] Int. Cl.$^5$ .............................................. C08L 95/00
[52] U.S. Cl. ..................................... 524/62; 524/68; 524/69; 524/70; 524/71; 106/284.04; 106/284.4
[58] Field of Search ............ 524/59, 61, 62, 64, 524/68, 69, 70, 71; 160/284.04, 284.06, 284.4

[56] References Cited

U.S. PATENT DOCUMENTS

| | | | |
|---|---|---|---|
| 1,661,828 | 3/1928 | Hopkinson | 524/68 |
| 3,359,229 | 12/1967 | Chalex et al. | 524/61 |
| 4,162,999 | 7/1979 | Bohemen | 524/64 |
| 4,242,246 | 12/1980 | Maldonado et al. | 524/71 |
| 4,554,313 | 11/1985 | Hagenbach et al. | 524/62 |
| 4,567,222 | 1/1986 | Hagenbach et al. | 524/476 |

FOREIGN PATENT DOCUMENTS 1941631 2/1971 Fed. Rep. of Germany .
2181587 12/1973 France .

*Primary Examiner*—Paul R. Michl
*Assistant Examiner*—Peter Szekely
*Attorney, Agent, or Firm*—Burgess, Ryan & Wayne

[57] ABSTRACT

A bitumen/polymer composition is provided exhibiting an adhesiveness which is retained on storage at elevated temperatures. Also provided is a process for the preparation of such a composition and to the application of this composition to the production of coatings and in particular of road surface dressings, asphalt mixes or seal coatings.

43 Claims, No Drawings

BITUMEN/POLYMER COMPOSITION EXHIBITING AN ADHESIVENESS WHICH IS RETAINED ON STORAGE AT ELEVATED TEMPERATURE AND PROCESS FOR PREPARING SUCH A COMPOSITION

BACKGROUND OF THE INVENTION

1. Field of the Invention

The invention relates to a bitumen/polymer composition exhibiting an adhesiveness which is retained on storage at elevated temperatures. It also relates to a process for the preparation of such a composition and to the application of this composition to the production of coatings and in particular of road surface dressings, asphalt mixes or seal coatings.

2. Description of the Related Art

Modification of bitumens by polymer addition plays a part in increasing the viscosity of the bitumen/polymer compositions obtained and ipso facto reduces the wettability of the said compositions or bitumen/polymer binders on the inorganic and organic surfaces in the event of nonconformance with the utilisation temperatures. This modification of the interfacial properties can be reflected in a decrease in the adhesiveness of the bitumen/polymer binder, due to the effect of water. In order to compensate for this defect, amino compounds are generally added to the bitumen/polymer composition before its use. However, the effectiveness of these amino compounds decreases very quickly after a few hours, disappearing completely after three or four days' storage between 150° C. and 160° C.

SUMMARY OF THE INVENTION

To overcome this disadvantage the invention proposes a bitumen/polymer composition modified with a nitrogen compound such as an amino compound, which is integrated irreversibly within the bitumen/polymer composition, which results in a bitumen/polymer composition exhibiting durable adhesive properties under the conditions of storage at temperatures of the order of 150°-160° C. usually employed for this composition.

The bitumen/polymer composition according to the invention is of the type comprising a bitumen and, based on the weight of bitumen, 0.5 to 15% of a polymer and 0.05 to 10% of an adhesion promoter consisting of one or more nitrogen compounds which have a molecular mass higher than 90 and are chosen from amines, amides, amidoamines, amine oxides, imidazolines, amine salts and imidazoline salts, and it is characterised in that the nitrogen compound(s) forming the adhesion promoter of the bitumen/polymer composition are grafted onto the polymer present in the said composition.

DESCRIPTION OF THE PREFERRED EMBODIMENTS

Advantageously, the nitrogen compounds from which the compound(s) forming the adhesion promoter of the bitumen/polymer composition are chosen, that is to say the component imparting the adhesiveness characteristics to the composition, are derivatives of general formula R—Z—R$_1$ and their salts, with R in this formula denoting a C$_3$–C$_{30}$ monovalent aliphatic hydrocarbon radical, Z denoting a divalent group chosen from

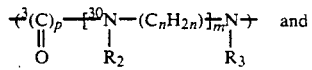

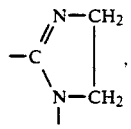

where n denotes an integer ranging from 2 to 6 and preferably from 2 to 4, m denotes zero or an integer ranging from 1 to 6 and preferably from 1 to 4, and p is equal to zero or 1, and each of R$_1$, R$_2$ and R$_3$, which are identical or different, denotes a hydrogen atom, a radical chosen from the radicals R, a C$_1$–C$_{18}$ and preferably C$_1$–C$_{12}$ alkyl, hydroxylalkyl or aminoalkyl radical or a radical $-(C_qH_{2q}O)_r$H with q denoting an integer equal to 2 or 3 and r denoting an integer ranging from 2 to 10.

In particular, the radical R of the compounds R—Z—R$_1$ which are defined above contains one or more unsaturations and may be especially an alkenyl, alkadienyl, alkatrienyl, alkatetraenyl or alkapentaenyl radical. The radical R is preferably chosen from those radicals R which contain 8 to 20 carbon atoms. Examples of radicals R which are suitable for the nitrogen compounds employed according to the invention are those such as 9-decenyl, 2,4-decadienyl, 2,4,6-decatrienyl, 9-dodecenyl, 9-hexadecenyl, 6-octadecenyl, 11-octadecenyl, 9,12,15-octadecatrienyl, 9,11,13,15-octadecatetraenyl, 6,9,12,15-octadecatetraenyl, 9-eicosenyl, 11-eicosenyl, 8,11,14,17-eicosatetraenyl,5,8,11,14-eicosatetraenyl,5,8,11,14,17-eicosapentaenyl, 11-docosenyl, 13-docosenyl, 7,10,13,16,17-docosapentaenyl and 15-tetracosenyl.

Adhesion promoting compounds according to the invention which are very specially suitable are the compounds of formulae

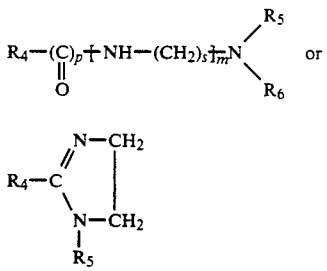

in which R$_4$ denotes a C$_8$–C$_{20}$ monovalent aliphatic hydrocarbon radical containing one or more unsaturations of the >C=C< type, each of the symbols R$_5$ and R$_6$, which are identical or different, denotes a hydrogen atom or a C$_1$–C$_8$ alkyl, aminoalkyl or hydroxyalkyl radical, p is equal to zero or 1, m denotes zero or an integer ranging from 1 to 6 and preferably from 1 to 4 and s is an integer ranging from 2 to 4.

Examples of such compounds which may be mentioned, no limitation being implied, are 9-decenylamine, 9-dodecenylamine,9-hexadecenylamine,6-octadecenylamine, oleylamine or 9-octadecenylamine, 2,4,6-decatrienylamine, 9,12,15-octadecatrienylamine, tallow propylenediamine hydrochloride, tallow propylenetriamine hydrochloride, N,N-dimethyloleylamide, N,N-diethyloleylamide, 2-oleyl1-(2-hydroxyethyl)imidazoline, tallow amine, copra amine and tallow propylenetriamine.

The bitumen which forms the predominant part of the bitumen/polymer composition according to the invention is chosen from the various bitumens which have a penetration, defined according to NFT standard 66004, of between 5 and 500 and preferably between 20 and 400. Such bitumens may be, in particular, direct distillation or vacuum distillation bitumens or blown or semiblown bitumens, the said bitumens having a penetration included within the abovementioned ranges.

The polymers which may be present in the bitumen/polymer composition may be chosen from the various polymers generally associated with bitumens in the bitumen/polymer compositions. The said polymers may be, for example, elastomers such as polyisoprene, butyl rubber, polybutene, polyisobutene, polyacrylates, polymethacrylates, polynorbornene, ethylene/propene copolymers, ethylene/propene/diene (EPDM) terpolymers or fluorinated polymers such as polytetrafluoroethylene, silicone polymers such as polysiloxanes, copolymers of olefins and of vinyl monomers such as ethylene/vinyl acetate copolymers, ethylene/acrylic ester copolymers, ethylene/vinyl chloride copolymers or polymers of the polyvinyl alcohol, polyamide, polyester or polyurethane type.

The polymer present in the bitumen/polymer composition is advantageously chosen from random or block copolymers of styrene and of a conjugated diene because these copolymers dissolve very easily in bitumens and impart excellent mechanical and dynamic properties to the latter, and especially very good viscoelasticity properties. In particular, the copolymer of styrene and conjugated diene is chosen from block copolymers of styrene and butadiene, of styrene and isoprene, of styrene and chloroprene, of styrene and carboxylated butadiene and of styrene and carboxylated isoprene. The copolymer of styrene and conjugated diene, and in particular each of the abovementioned copolymers, advantageously has a weight content of styrene ranging from 15% to 40%. The mean viscometric molecular mass of the copolymer of styrene and conjugated diene, and especially that of the copolymers referred to above, may be included, for example, between 30,000 and 300,000 and preferably lies between 70,000 and 200,000.

The copolymer of styrene and conjugated diene is preferably chosen from di- or triblock copolymers of styrene and butadiene, of styrene and isoprene, of styrene and carboxylated butadiene or of styrene and carboxylated isoprene, which have styrene contents and molecular masses situated in the ranges defined above.

In relation to the weight of the bitumen, the preferred proportions of polymer and of adhesion promoter which are present in the bitumen/polymer composition which are present in the bitumen/polymer composition represent 0.7 to 10% and 0.1 to 5% respectively.

The bitumen/polymer composition may also contain 1 to 30% and more particularly 3 to 20%, by weight of bitumen, of a flux agent which may consist, in particular, of a hydrocarbon oil which has a distillation range at atmospheric pressure, determined according to ASTM standard D 86-67, of between 100° C. and 450° C. and situated more especially between 150° C. and 380° C. Such a hydrocarbon oil may be, for example, a petroleum cut of aromatic nature, a petroleum cut of naphtheno-aromatic nature, a petroleum cut of naphtheno-paraffinic nature, a petroleum cut of paraffinic nature, a coal oil or else an oil of vegetable origin. This hydrocarbon oil must be sufficiently "heavy" to limit the evaporation when it is being incorporated into the bitumen and at the same time sufficiently "light" for as much as possible to be removed during and after the spreading of the bitumen/polymer composition containing it, so as to restore the same mechanical properties which the bitumen/polymer composition free from hydrocarbon oil would have exhibited after being spread hot.

A process for the preparation of the bitumen/polymer composition according to the invention is of the type in which the chosen bitumen and, counted as the weight of the bitumen, 0.5 to 15% and preferably 0.7 to 10% of the polymer and 0.05 to 10% and preferably 0.1 to 5% of the nitrogenous adhesion promoter are brought into contact, the operation being carried out at a temperature of between 100° C. and 230° C. and with stirring for a period of at least 10 minutes, and is characterised in that the said contact is brought about in the presence of a coupling agent supplying free elemental or radical sulphur, the said coupling agent being present in the mixture containing the bitumen, the polymer and the adhesion promoter in a quantity capable of supplying a quantity of free sulphur representing 0.1 to 10% and preferably 0.5 to 8% of the overall weight of polymer and of adhesion promoter in the said mixture.

Without being bound by this theory, it is thought that during the implementation of the above process the adhesion promoter is grafted to the bitumen/polymer component and more especially to the chains of the polymer present in the reaction mixture, and this results in an irreversible integration of the adhesion promoter within the bitumen/polymer composition.

In order to implement the process according to the invention, a mixture of the various ingredients is first of all produced at a temperature of between 100° C. and 230° C. and with stirring, namely a mixture of bitumen, polymer, adhesion promoter and coupling agent, forming the reaction mixture, and the reaction mixture obtained is then maintained within the said temperature range for a period of at least 10 minutes and generally ranging from 10 to 180 minutes, to enable the free sulphur supplied by the coupling agent to initiate, on the one hand, grafting of the adhesion promoter to the bitumen/polymer component and more particularly to the chains of the polymer which is present in the reaction mixture and, on the other hand, if appropriate, the bridging of the polymer chains together and/or with the bitumen.

According to an embodiment of the process according to the invention, the operation is carried out by first of all bringing the polymer into contact with the bitumen, in the chosen proportions, at a temperature between 100° C. and 230° C. and with stirring, for a sufficient period, generally of the order of a few tens of minutes to a few hours, to form a homogeneous mixture, and then the adhesion promoter and the coupling agent are added to the mixture obtained and the whole is kept stirred at a temperature of between 100° C. and 230° C., corresponding, for example, to the temperature at which the polymer is brought into contact with the bitumen, for a period of at least 10 minutes and generally ranging from 10 to 180 minutes.

The quantities of polymer, adhesion promoter and coupling agent which are added to the bitumen are chosen so as to be included within the ranges defined above for these quantities.

When a bitumen/polymer composition containing a flux agent is produced according to the invention, this agent may be added to the reaction mixture which is made up from bitumen, polymer, adhesion promoter and coupling agent at any time during the formation of the said reaction mixture, the quantity of flux agent being chosen so as to be included within the ranges defined above for this quantity.

According to an advantageous embodiment of this type of bitumen/polymer composition, the polymer, the coupling agent and optionally the adhesion promoter are incorporated into the bitumen in the form of a master solution of these products in the flux agent and in particular in the hydrocarbon oil defined above as being capable of forming the flux agent. If not present in the master solution, the adhesion promoter may be incorporated into the bitumen before, during or after the incorporation of the master solution into the latter.

The master solution is prepared by bringing into contact the ingredients of which it consists, namely flux agent used as solvent, polymer, adhesion promoter and coupling agent, with stirring, at temperatures of between 20° and 170° C. and more particularly between 40° and 120° C, for a sufficient period, for example from approximately 30 minutes to approximately 120 minutes, to obtain a complete dissolution of the polymer, of the adhesion promoter and of the coupling agent in the flux agent.

The corresponding concentrations of the polymer, adhesion promoter and coupling agent in the master solution may vary quite widely as a function especially of the nature of the flux agent employed to dissolve the polymer, the adhesion promoter and the coupling agent. Thus, the corresponding quantities of polymer, of adhesion promoter and of coupling agent may advantageously represent 5% to 40%, 0.5% to 25% and 0.01% to 10% of the weight of the flux agent. A preferred master solution contains, based on the weight of the fluxing agent of the hydrocarbon oil type as defined above, 10 to 35% of polymer, 1 to 20% of adhesion promoter and 0.05 to 5% of coupling agent.

To prepare the bitumen/polymer composition by employing the master solution, the master solution of the polymer, of the adhesion promoter and of the coupling agent in the flux agent is mixed with the bitumen, the operation being carried out at a temperature of between 100° C. and 230° C. and with stirring, this being done, for example, by adding the master solution to the bitumen which is kept stirred at the chosen temperature between 100° C. and 230° C., and the resulting mixture is then kept stirred at a temperature of between 100° and 230° C., for example at the temperature employed for mixing the bitumen and the master solution, for a period of at least 10 minutes and generally ranging from 10 to 180 minutes, to permit, by means of the coupling agent, the grafting of the adhesion promoter to the bitumen/polymer component and more particularly to the chains of the polymer present in the reaction mixture and, if appropriate, the bridging of the polymer chains between each other and/or with the bitumen.

The quantity of master solution which is mixed with the bitumen is chosen to provide the desired quantities of polymer, adhesion promoter and coupling agent, in relation to the bitumen, the said quantities being within the ranges defined above.

An embodiment which is advantageous for the preparation of the bitumen/polymer compositions according to the invention containing a flux agent of the hydrocarbon oil type, making use of the master solution technique, consists in bringing into contact, at a temperature of between 100° C. and 230° C. and with stirring, from 80 to 95% by weight of the bitumen with 20 to 5% by weight of the master solution, the latter containing, based on the weight of the hydrocarbon oil used as flux agent, 10 to 35% of polymer, 1 to 20% of adhesion promoter and 0.05 to 5% of coupling agent, and then in keeping the mixture thus produced stirred at a temperature of between 100° C. and 230° C., and preferably at the temperature employed for bringing the bitumen into contact with the master solution, for a period of at least 10 minutes, and especially of between 10 and 90 minutes, to allow the coupling agent to act.

The bitumen, the polymer, the adhesion promoter and the flux agent, when it is employed, are advantageously chosen from the products which were defined above.

The coupling agent supplying free sulphur may consist of a product chosen from elemental sulphur, hydrocarbyl polysulphides, sulphur-donating vulcanisation accelerators or mixtures of such products with each other and/or with vulcanisation accelerators which are not sulphur donors. In particular, the coupling agent is chosen from the products M which contain, by weight, from 0% to 100% of a component A consisting of one or more sulphur-donating vulcanisation accelerators and from 100% to 0% of a component B consisting of one or more vulcanising agents chosen from elemental sulphur and hydrocarbyl polysulphides, and the products N which contain a component C consisting of one or more vulcanisation accelerators which are not sulphur donors and a product M in a weight ratio of component C to the product M ranging from 0.01 to 1 and preferably from 0.05 to 0.5.

The elemental sulphur which may be employed, partially or completely, to form the coupling agent is advantageously flowers of sulphur and preferably sulphur crystallised in the orthorhombic form and known by the name of alpha sulphur.

The hydrocarbyl polysulphides which may be employed to form at least a part of the coupling agent corresponding to the general formula

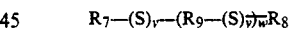

in which each of $R_7$ and $R_8$ denotes a $C_1-C_{20}$, saturated or unsaturated, monovalent hydrocarbon radical, or both are linked together to form a $C_2-C_{20}$, saturated or unsaturated, divalent hydrocarbon radical forming a ring with the other groups of atoms associated in the formula, $R_9$ is a $C_1-C_{20}$, saturated or unsaturated, divalent hydrocarbon radical, the $—(S)_v—$ groups denote divalent groups, each made up of v sulphur atoms, it being possible for the v values to be different from one of the said groups to another and to denote integers ranging from 1 to 6 with at least one of the v being equal to or greater than 2, and w denotes an integer taking the values from zero to 10.

In the abovementioned formula the $C_1-C_{20}$ monovalent hydrocarbon radicals $R_7$ and $R_8$ and the $C_1-C_{20}$ divalent hydrocarbon radical $R_9$ are chosen especially from aliphatic, alicyclic or aromatic radicals. When the radicals $R_7$ and $R_8$ are linked together to form a $C_1-C_{20}$ divalent hydrocarbon radical forming a ring with the other groups of atoms associated in the formula, the said divalent radical is similar to the radical $R_9$ and may also be of the aliphatic, alicyclic or aromatic type. In particular, the radicals $R_7$ and $R_8$ are identical and are chosen from $C_1-C_{20}$ alkyl radicals, for example ethyl, propyl, hexyl, octyl, nonyl, decyl, linear dodecyl, tert-dodecyl, hexadecyl and octadecyl, and $C_6-C_{20}$ cycloalkyl and aryl radicals, especially benzyl, phenyl, tolyl and cyclohexyl, while the radical $R_9$ or the divalent radical formed by the linking of $R_7$ and $R_8$ are chosen from $C_1-C_{20}$ alkylene radicals or $C_6-C_{20}$ cycloalkylene or arylene radicals, especially phenylene, tolylene and cyclohexylene.

The polysulphides which may be employed according to the invention are in particular those defined by the formula $R_7-(S)_u-R_8$ in which each of $R_7$ and $R_8$ denotes a $C_1-C_{20}$, saturated or unsaturated, monovalent hydrocarbon radical or both are linked together to form a $C_1-C_{20}$ divalent radical $R_9$, with $R_7$, $R_8$ and $R_9$ having the above meanings, $-(S)_u-$ denotes a divalent group formed by a chain sequencing of u sulphur atoms, u being an integer ranging from 2 to 6.

The preferred polysulphides correspond to the general formula $R_{10}-(S)_t-R_{10}$ in which $R_{10}$ denotes a $C_6-C_{16}$ alkyl radical and $-(S)_t-$ denotes a divalent group formed by a chain sequence of t sulphur atoms, t being an integer ranging from 2 to 5. Examples of such polysulphides are especially dihexyl disulphide, dioctyl disulphide, didodecyl disulphide, di-tert-dodecyl disulphide, dihexadecyl disulphide, dihexyl trisulphide, dioctyl trisulphide, dinonyl trisulphide, di-tert-dodecyl trisulphide, dihexadecyl trisulphide, dihexyl tetrasulphide, dioctyl tetrasulphide, dinonyl tetrasulphide, di-tert-dodecyl tetrasulphide, dihexadecyl tetrasulphide, dihexyl pentasulphide, dioctyl pentasulphide, dinonyl pentasulphide, di-tert-dodecyl pentasulphide and dihexadecyl pentasulphide.

Other polysulphides which may be employed according to the invention are, for example, those such as diphenyl trisulphide, dibenzyl trisulphide, diphenyl tetrasulphide, ortho-tolyl tetrasulphide, dibenzyl tetrasulphide, dibenzyl pentasulphide, diallyl pentasulphide and tetramethyltetrathiane.

The sulphur-donating vulcanisation accelerators may be chosen, in particular, from the thiuram polysulphides of general formula

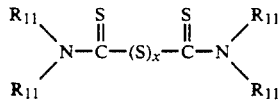

in which each of the $R_{11}$, which are identical or different, denotes a $C_1-C_{12}$ and preferably $C_1-C_8$ hydrocarbon radical, especially an alkyl, cycloalkyl or aryl radical, or else two radicals R which are attached to the same single nitrogen atom are linked together to form a $C_2-C_8$ hydrocarbon divalent radical and x is a number ranging from 2 to 8.

Examples of such vulcanisation accelerators which may be mentioned are especially the compounds: dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

Other examples of sulphur-donating vulcanisation accelerators which may also be mentioned are alkylphenol disulphides and disulphides such as morpholine disulphide and N,N,-caprolactam disulphide.

The vulcanisation accelerators which are not sulphur donors may be sulphur compounds chosen especially from mercaptobenzothiazole and its derivatives, the dithiocarbamates of general formula (I)

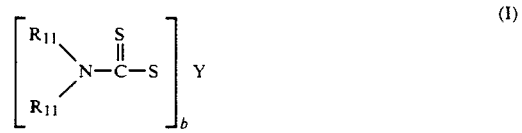

in which the $R_{11}$ radicals, which are identical or different, have the meaning given above, Y denotes a metal and b denotes the valency of Y, and the thiuram monosulphides of general formula (II)

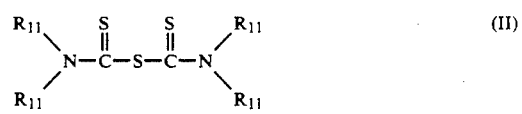

in which the $R_{11}$ radicals, which are identical or different, have the meaning given above.

Examples of vulcanisation accelerators of the mercaptobenzothiazole type may be those such as mercaptobenzothiazole, zinc benzothiazolethiolate, sodium benzothiazolethiolate, benzothiazyl disulphide, copper benzothiazolethiolate, benzothiazyl N,N'-diethylthiocarbamyl sulphide and benzothiazolesulphenamides such as 2-benzothiazolediethylsulphenamide, 2-benzothiazolepentamethylenesulphenamide, 2-benzothiazolecyclohexylsulphenamide, N-oxydiethylene-2-benzothiazolesulphenamide, N-oxydiethylene-2-benzothiazolethiosulphenamide, 2-benzothiazoledicyclohexylsulphenamide, 2-benzothiazole-diisopropylsulphenamide, 2-benzothiazole-tert-butylsulphenamide and N-oxydiethylenethiocarbamyl-N'-oxydiethylenesulphenamide.

Among the vulcanisation accelerators of the type of dithiocarbamates of general formula (I), particular mention may be made of the compounds: bismuth dimethyldithiocarbamate, cadmium diamyldithiocarbamate, cadmium diethyldithiocarbamate, copper dimethyldithiocarbamate, zinc dibutyldithiocarbamate, lead diamyldithiocarbamate, lead dimethyldithiocarbamate, lead pentamethylenedithiocarbamate, selenium dimethyldithiocarbamate, tellurium diethyldithiocarbamate, zinc diamyldithiocarbamate, zinc dibenzyldithiocarbamate, zinc diethyldithiocarbamate, zinc dimethyldithiocarbamate and zinc pentamethylenedithiocarbamate.

Examples of thiuram monosulphides corresponding to the formula (II) which may be mentioned are the compounds such as dipentamethylenethiuram monosulphide, tetrabutylthiuram monosulphide, tetraethylthiuram monosulphide and tetramethylthiuram monosulphide.

Other vulcanisation accelerators which are not sulphur donors and which do not belong to the categories defined above may also be employed. Such vulcanisation accelerators may be those such as 1,3-diphenylguanidine, di-ortho-tolylguanidine and zinc oxide, it being possible for the latter compound to be employed optionally in the presence of fatty acids of the stearic acid, ethylcaproic acid or lauric acid type.

The sulphur-donating vulcanisation accelerators which may be used according to the invention are advantageously those such as tetramethylthiuram disulphide, tetraethylthiuram disulphide and dipentamethylenethiuram tetrasulphide and the vulcanisation accelerators which are not sulphur donors are those such as 2-mercaptobenzothiazole, dibenzothiazyl disulphide, zinc benzothiazolethiolate, 2-benzothiazolecyclohexylsulphenamide, N-oxydiethylene-2-benzothiazolesulphenamide, 2-benzothiazolediisopropylsulphenamide, 2-benzothiazoledicyclohexylsulphenamide, zinc dimethyldithiocarbamate, zinc diethyldithiocarbamate, zinc dibutyldithiocarbamate, tetramethylthiurammonosulphide, di-ortho-tolylguanidine, morpholine disulphide and zinc oxide.

Suitable additives can also be incorporated into the reaction mixture giving rise to the bitumen/polymer composition according to the invention. Thus, unsaturated compounds such maleic anhydride may be added to the said mixture in a quantity representing 0.05 to 0.5% by weight of the bitumen.

The bitumen/polymer composition according to the invention, which exhibits an adhesiveness which is retained on storage at elevated temperature can be employed for producing coatings and in particular road surface dressings, asphalt mixes or seal coatings.

The invention is illustrated by the following examples, which are given without any limitation being implied.

In these examples, which describe the production of bitumen/polymer compositions according to the invention and of control bitumen/polymer compositions, the adhesiveness of the bitumen/polymer compositions after storage for various periods was evaluated by making use of either of the following two tests.

Modified test for overall adhesion to the Vialit panel

Objective of the test

This test is designed to evaluate the adhesiveness of granulates and their bonding to the binder (bitumen/polymer composition), which is spread in the case of surface dressings. This test, carried out with dry and clean granulates is a test for overall adhesion.

Application of the modified test

A determined quantity of binder is spread over a steel panel 200×200 mm in size and 2 mm in thickness.

100 graded 10/14 mm granulates are gritted onto the binder.

The granulate is applied with the aid of a rubber-sleeveded roll used to perform 6 runs over the panel (three in one direction, then three perpendicularly to the first direction).

The granulate-covered panel thus prepared is immersed in a bath of water at 25° C. for 48 hours.

The panel, taken out of the water, is placed on a three-point support, the gravel being on the lower part of the panel, and a 500 g steel ball is dropped on the panel from a height of 50 cm, this being done three times in 10 seconds.

The adhesiveness value is expressed by the number of granulates stained by the binder, whether bonded to the panel or not.

Test for the behaviour of a hydrocarbon binder film in the presence of water (passive adhesiveness test):

Objective of the test

Empirical evaluation of the mutual affinity of a hydrocarbon binder for granulates in the presence of water. This test is a test for passive adhesion, that is to say that it makes it possible to give an assurance that water will not displace the binder from the surface of the coated granulates.

Performance of the test

This test, which consists in immersing in water, under specified conditions, granulates which are coated with a hydrocarbon binder (bitumen/polymer composition) and in evaluating the percentage of the area coated with binder after a certain immersion time, is carried out as follows:

100 g of 4/6.3 mm granulates are poured into a capsule kept on a hot plate and containing 5 g of binder and at least two products are mixed thoroughly in the capsule with a stirrer and the mixture obtained is then introduced into a beaker which is covered with a clock glass and left to stand for half an hour.

300 ml of demineralised water at 60° C. are then poured into the beaker and the beaker is then covered with a clock glass and the whole is kept in air at 60° C.

The areas coated with a film of the binder are assessed visually, and a score corresponding to the following scale is given:
100 no uncoated area
90 more than approximately 90% of the areas are coated
75 approximately 75 to 90% of the areas are coated
50 approximately 50 to 75% of the areas are coated
<50 less than 50% of the areas are coated
0 the binder is separated from the granulates.

In the examples given below, the quantities are expressed by weight, unless shown otherwise.

EXAMPLE 1

Preparation of a composition according to the invention:

Into a stirred reactor maintained at 180° C. were introduced 2000 parts of a bitumen of 80/100 penetration and 62 parts of a styrene/butadiene block copolymer containing 25% by weight of styrene and exhibiting a viscometric molecular mass of approximately 75,000. After 2.5 hours, 10 parts of an adhesion promoter consisting of N,N-dimethyloleylamide were added to the contents of the reactor and stirring was continued at the same temperature for 30 minutes, after which 2 parts of sulphur were introduced into the reactor. The reaction mixture thus formed in the reactor was then maintained at 180° C. for 1 hour.

The bitumen/polymer composition obtained was placed in sealed metal tins and was then kept in the latter at 180° C. in a thermostated oven.

The contents of the tins were subjected to the modified Vialit test for overall adhesion after various periods of storage at 180° C.

Preparation of a control composition

Into a stirred reactor maintained at 180° C. were introduced 2000 parts of a bitumen of 80/100 penetration and 62 parts of a styrene/butadiene block copolymer containing 25% by weight of styrene and exhibiting a viscometric molecular mass of approximately 75,000. After 2.5 hours, two parts of sulphur were added to the contents of the reactor. The reaction mixture thus formed in the reactor was maintained at 180° C. for 1 hour. 10 parts of an adhesion promoter consisting of N,N-dimethyloleylamide were then added to the contents of the reactor and then, after the said component had dissolved in the bitumen/polymer composition, the resulting product was placed in sealed metal tins which were kept at 180° C. in a thermostated oven.

The contents of the tins containing the control bitumen/polymer composition were also subjected to the modified Vialit test for overall adhesion after various periods of storage at 180° C.

The results of the Vialit overall adhesion tests performed on the bitumen/polymer composition according to the invention and on the control bitumen/polymer composition are shown in Table I.

Comparison of the results which appear in Table I reveals the substantially improved adhesiveness on storage of the bitumen/polymer composition according to the invention, in the case of which the adhesiphoric agent is attached irreversibly by grafting within the bitumen/polymer composition.

dinonyl pentasulphide were added to the contents of the reactor.

The reaction mixture thus formed in the reactor was maintained at 180° C. for 2 hours. 10 parts of an adhesion promoter consisting of 2,4,6-decatrienylamine were then added to the contents of the reactor and then, after the said component had dissolved in the mixture, the resulting product was placed in sealed metal tins, which were kept at 180° C. in a thermostated oven.

The contents of the tins containing the control composition were also subjected to the modified test for overall adhesion to the Vialit panel.

The results of the Vialit overall adhesion tests performed on the bitumen/polymer composition according to the invention and on the control bitumen/polymer composition are shown in Table II.

TABLE I

| COMPOSITION | INVENTION | | | | | CONTROL | | | | |
| --- | --- | --- | --- | --- | --- | --- | --- | --- | --- | --- |
| Storage period at 180° C. (days) | 0 | 5 | 15 | 30 | 60 | 0 | 5 | 15 | 30 | 60 |
| ADHESIVENESS* | | | | | | | | | | |
| Limestone | 100 | 100 | 100 | 100 | 100 | <75 | <75 | <50 | <<50 | <<50 |
| Diorite | 100 | 100 | 100 | 100 | 100 | <75 | <75 | <50 | <<50 | <<50 |
| Flint | 100 | 100 | 100 | 100 | 100 | <50 | <50 | <<50 | <<50 | <<50 |
| Quartzite | 100 | 100 | 100 | 100 | 100 | <50 | <50 | <<50 | <<50 | <<50 |

*Modified test for overall adhesion to the Vialit panel.

TABLE II

| COMPOSITION | INVENTION | | | | | CONTROL | | | | |
| --- | --- | --- | --- | --- | --- | --- | --- | --- | --- | --- |
| Storage period at 180° C. (days) | 0 | 5 | 15 | 30 | 60 | 0 | 5 | 15 | 30 | 60 |
| ADHESIVENESS* | | | | | | | | | | |
| Limestone | 98 | 98 | 99 | 97 | 97 | 99 | 38 | 6 | 3 | 0 |
| Flint | 100 | 99 | 100 | 100 | 99 | 100 | 32 | 5 | 2 | 0 |

*Modified test for overall adhesion to the Vialit panel.

EXAMPLE 2

Preparation of a composition according to the invention:

Into a stirred reactor maintained at 180° C. were introduced 2000 parts of a bitumen of 180/220 penetration and 106 parts of a styrene/butadiene block copolymer containing 30% by weight of styrene and exhibiting a viscometric molecular mass of approximately 150,000. After 3 hours' dissolving, 13 parts of an adhesion promoter consisting of 2,4,6-decatrienylamine were added to the contents of the reactor and stirring was continued at the same temperature for 30 minutes. 11 parts of dinonyl pentasulphide were then introduced into the reactor. The reaction mixture thus formed in the reactor was then maintained at 180° C. for two hours.

The bitumen/polymer composition obtained was placed in sealed metal tins and was then kept in the latter at 180° C. in a thermostated oven.

The contents of the tins were subjected to the modified Vialit test for overall adhesion after variable periods of storage at 180° C.

Preparation of a control composition

Into a stirred reactor kept at 180° C. were introduced 2000 parts of a bitumen of 180/220 penetration and 106 parts of the styrene/butadiene block copolymer described above. After 3 hours' dissolving, 11 parts of Comparison of the results which appear in table II again reveals the greatly improved adhesiveness on storage of the bitumen/polymer composition according to the invention.

EXAMPLE 3

Preparation of a composition according to the invention:

Into a stirred reactor maintained at 180° C. were introduced 2000 parts of a bitumen of 80/100 penetration and 62 parts of a styrene/butadiene block copolymer containing 25% by weight of styrene and exhibiting a viscometric molecular mass of approximately 120,000. After 2.5 hours' stirring to dissolve the copolymer in the bitumen, 1.1 parts of maleic anhydride, 4.8 parts of tallow amine and 1.6 parts of sulphur were added to the contents of the reactor.

The reaction mixture thus formed was then maintained at 180° C. for two hours to perform the grafting and bridging reactions initiated by the sulphur.

The bitumen/polymer composition obtained was subjected to the modified test for overall adhesion to the Vialit panel immediately after its manufacture and also after storage for one month in a hermetic container maintained at 160° C.

The values of immediate adhesion and that after storage, expressed on the marking scale of the test, were equal to 98 and 96 respectively.

EXAMPLE 4

Preparation of a composition according to the invention

First of all, a master solution was prepared as follows. Into a stirred reactor maintained between 80° C. and 100° C. were introduced 238.5 parts of a petroleum cut of naphtheno-aromatic nature, exhibiting a distillation range according to ASTM standard D 86-67 ranging from 200° C. to 350° C., followed by 53.7 parts of a styrene/butadiene block copolymer containing 30% by weight of styrene and having a viscometric molecular mass of approximately 120,000. After two hours' stirring at the operating temperature to dissolve the copolymer, 6 parts of tallow propylenetriamine and 1.2 parts of sulphur were added.

300 parts of the master solution obtained were introduced into a stirred reactor maintained at 160° C. and containing 1700 parts of a bitumen of 80/100 penetration. The reaction mixture thus formed was then maintained at a temperature of 170° C. for 1 hour to perform the grafting and bridging reactions using the sulphur.

The bitumen/polymer composition thus produced was then stored in hermetic containers maintained at 160° C. in a thermostated oven.

The stored bitumen/polymer composition was subjected to the passive adhesiveness test after various periods of storage.

Preparation of a control composition

A master solution was prepared as shown in the first part of the example, but without employing any adhesion promoter (tallow propylenetriamine).

300 parts of the master solution were introduced into a stirred reactor maintained at 160° C. and containing 1700 parts of a bitumen of 80/100 penetration. The reaction mixture thus formed was then maintained at approximately 170° C. for 1 hour. When the reaction stage was finished, 6 parts of the adhesion promoter (tallow propylenetriamine) were introduced into the reactor. After dissolving the said component, the composition obtained was kept in hermetic containers maintained at 160° C. in a thermostated oven.

The stored control bitumen/polymer composition was also subjected to the passive adhesiveness test after various storage periods.

The results of the passive adhesiveness tests performed on the bitumen/polymer composition according to the invention and on the control bitumen/polymer composition are collated in Table III.

Comparison of the results shown in Table III again reveals the improved adhesiveness on storage at elevated temperature of the bitumen/polymer composition according to the invention.

TABLE III

|  | Storage period at 160° C. (days) | | | | | | | | |
|---|---|---|---|---|---|---|---|---|---|
| INVENTION PASSIVE ADHESIVENESS (% of area coated) | 0 | 6 | 14 | 22 | 28 | 36 | 43 | 59 | 65 |
| Limestone | 50 | 50 | 50 | 50 | 50 | 50 | 75 | 75 | 75 |
| Quartzite | 90 | 90 | 90 | 90 | 90 | 90 | 90 | 90 | 90 |
| Silica | 90 | 90 | 90 | 90 | 90 | 90 | 90 | 90 | 90 |
| Diorite | 90 | 90 | 90 | 90 | 90 | 90 | 90 | 90 | 90 |
|  | Storage period at 160° C. (days) | | | | | | | | |
| CONTROL PASSIVE ADHESIVENESS (% of area coated) | 0 | 1 | 3 | 5 | 8 | | | | |
| Limestone | 50 | 50 | <50 | <50 | <50 | | | | |
| Quartzite | 90 | 90 | 75 | 50 | <50 | | | | |
| Silica | 90 | 75 | 50 | 50 | <50 | | | | |
| Diorite | 90 | 90 | 75 | 75 | 75 | | | | |

EXAMPLE 5

A composition according to the invention was prepared by proceeding as follows:

Into a stirred reactor maintained at 180° C. were introduced 2000 parts of a bitumen of 180/220 penetration and 70 parts of the block copolymer employed in Example 3. After 2.5 hours' stirring to dissolve the copolymer in the bitumen, 15.7 parts of copra amine and 1.7 parts of sulphur were added to the contents of the reactor. The reaction mixture thus formed was then maintained at 180° C. for two hours to perform the grafting and bridging reactions-initiated by the sulphur.

The bitumen/polymer composition thus produced was then stored in hermetic containers maintained at 160° C. in a thermostated oven.

The bitumen/polymer composition thus stored was subjected to the passive adhesiveness test after various storage periods at 160° C.

The results of the said test are shown in Table IV.

TABLE IV

| Storage period at 160° C. (days) | Passive adhesiveness (% of area coated) | | | |
|---|---|---|---|---|
|  | Limestone | Quartzite | Silica | Diorite |
| 0 | 75 | 90 | 90 | 90 |
| 7 | 75 | 90 | 90 | 90 |
| 15 | 75 | 90 | 75 | 90 |

We claim:

1. Process for the preparation of a bitumen/polymer composition exhibiting an adhesiveness which is retained on storage at elevated temperature, wherein a bitumen and, based on the weight of the bitumen, 0.5 to 15% of a polymer and 0.05 to 10% of an adhesion promoter consisting of one or more nitrogen compounds which have a molecular mass higher than 90 and are chosen from the group consisting of the derivatives of general formula R—Z—$R_1$ and the corresponding amine salts, amine oxides and imidazoline salts, are brought into contact at a temperature of between about 100° C. and about 230° C. and with stirring for a period of at least 10 minutes in the presence of the said coupling agent supplying free elemental or radical sulfur, the said coupling agent being present in the mixture containing the bitumen, the polymer and the adhesion promoter in a quantity capable of supplying a quantity of free sulfur representing 0.1 to 10% of the overall weight of polymer and of adhesion promoter in the said mixture and wherein in the formula R—Z—$R_1$, R denotes a $C_3$-$C_{30}$ monovalent aliphatic hydrocarbon radical containing at least one unsaturated group, Z denotes a divalent group selected from the group consisting of:

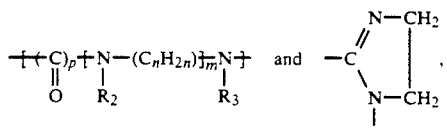

where n denotes an integer ranging from 2 to 6, m denotes zero or an integer ranging from 1 to 6, and p is equal to zero or 1, and each of $R_1$, $R_2$ and $R_3$ which are identical or different, denotes a hydrogen atom, a radical chosen from the radicals R, a $C_1$-$C_{18}$ alkyl, aminoalkyl or hydroxyalkyl radical or a $-(C_qH_{2q}O)_rH$ radical with q denoting a number equal to 2 or 3 and r denoting an integer ranging from 2 to 10.

2. Process according to claim 1, wherein the coupling agent is employed in a proportion which is suitable for supplying a quantity of free sulphur representing 0.5 to 8% of the overall weight of polymer and of adhesiphoric component in the reaction mixture.

3. Process according to claim 1, where in the general formula $R-Z-R_1$ of the compounds forming the adhesion promoter, the radical R comprises a radical selected from the group consisting of an alkenyl, alkadienyl, alkatrienyl, alkatetraenyl and alkapentaenyl radical.

4. Process according to claim 1 or 4, wherein in the formula $R-Z-R_1$ of the compounds forming the adhesion promoter the radical R is $C_8$-$C_{20}$.

5. Process according to claim 1, wherein the compound(s) forming the adhesion promoter are derivatives corresponding to either of the formulae

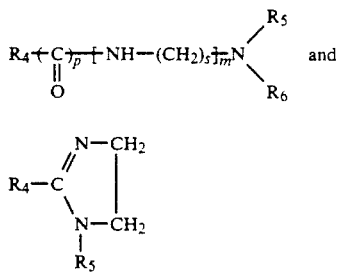

in which $R_4$ denotes a $C_8$-$C_{20}$ monovalent aliphatic hydrocarbon radical containing at least one unsaturated group of the $>C=C<$ type, each of the symbols $R_5$ and $R_6$, which are identical or different, denotes a hydrogen atom or a $C_1$-$C_8$ alkyl, aminoalkyl or hydroxyalkyl radical, p is equal to zero or 1, m denotes zero or an integer ranging from 1 to 6 and s is an integer ranging from 2 to 4.

6. Process according to one of claim 1, the bitumen has a penetration, according to French NF standard T 66004, of between 5 and 500.

7. Processing according to one of claim 1 wherein the polymer employed is a copolymer chosen from random or block copolymers of styrene with a conjugated diene, the said diene being butadiene, isoprene, chloroprene, carboxylated butadiene or carboxylated isoprene.

8. Process according to claim 7, characterised in that the copolymer of styrene and of conjugated diene has a weight content of styrene ranging from 15% to 40%.

9. Process according to claim 7 wherein in that the copolymer has an average viscometric molecular mass of between 30,000 and 300,000.

10. Process according to claim 1 wherein the polymer and the adhesion promoter are employed in quantities representing 0.7 to 10% and 0.1 to 5% of the weight of the bitumen respectively.

11. Process according to claim 1 wherein the reaction mixture resulting from bringing the bitumen, the polymer, the adhesion promoter and the coupling agent into contact also contains 1 to 30%, based on the weight of the bitumen, of a flux agent, the said flux agent being in particular a hydrocarbon oil exhibiting a distillation range at atmospheric pressure, determined according to ASTM standard D 86-67, of between 100° C. and 450° C.

12. Process according to claim 1 wherein a mixture of the various ingredients intended to constitute the reaction mixture is produced first of all at a temperature of between 100° C. and 230° C. and with stirring, and the reaction mixture obtained is then maintained in the said temperature range for a period ranging from 10 to 180 minutes, 13. Process according to clam 12, characterised in that the constitution of the reaction mixture from the ingredients of which it is made up is produced by first of all bringing the polymer into contact with the bitumen until a homogeneous mixture is obtained and then by incorporating the remaining ingredients into the said mixture of bitumen and polymer.

14. Process according to claim 11 wherein the polymer, the coupling agent and optionally the adhesion promoter are incorporated into the bitumen in the form of a master solution of these products in the flux agent, the adhesion promoter, when it is not present in the master solution, being incorporated into the bitumen before, during or after incorporation of the master solution into the latter.

15. Process according to claim 14, wherein the corresponding quantities of polymer, of adhesion promoter and of coupling agent in the master solution represent respectively 5% to 40%, 0.5% to 25% and 0.01 to 10% of the weight of the flux agent.

16. Process according to claim 15, wherein the corresponding quantities of polymer, of adhesion promoter and of coupling agent in the master solution represent respectively 10 to 35%, 1 to 20% and 0.05 to 5% of the weight of the flux agent.

17. Process according to claim 16, wherein 80 to 95% by weight of bitumen is brought into contact with 20 to 5% by weight of the master solution to form the reaction mixture.

18. Process according to claim 1 wherein the coupling agent is chosen from the products M, which contain, by weight, from 0% to 100% of a component A consisting of one or more sulphurdonating vulcanisation accelerators and from 100% to 0% of a component B consisting of one or more vulcanising agents chosen from elemental sulphur and hydrocarbyl polysulphides, and the products N which contain a component C consisting of one or more vulcanisation accelerators which are not sulphur donors and a product M in a weight ratio of component C to the product M ranging from 0.01 to 1.

19. Process according to claim 18, wherein the coupling agent consists of elemental sulphur.

20. Process according to claim 18, wherein that the coupling agent consists of one or more hydrocarbyl polysulphides of formula $$R_7-(S)_x-(R_9-(S)_x)_n-R_8$$

in which each of $R_7$ and $R_8$ denotes a $C_1$-$C_{20}$, saturated or unsaturated, monovalent hydrocarbon radical, or they are linked together to form a $C_2$-$C_{20}$, saturated or unsaturated, divalent hydrocarbon radical forming a ring with the other groups of atoms associated in the formula, $R_9$ is a $C_1$-$C_{20}$, saturated or unsaturated, divalent hydrocarbon radical, the —$(S)_v$— groups denote divalent groups, each made up of v sulphur atoms, it being possible for the values v to differ from one of the said groups to another and to denote integers ranging from 1 to 6 with at least one of the v values being equal to or greater than 2, and w denotes an integer taking the values,, from zero to 10.

21. Process according to claim 20, wherein the said hydrocarbyl polysulphide(s) correspond to the formula $R_{10}$—$(S)_t$—$R_{10}$, in which $R_{10}$ denotes a $C_6$-$C_{16}$ alkyl radical and —$(S)_t$— denotes a divalent group formed by a chain sequencing of t sulphur atoms, t being an integer ranging from 2 to 5.

22. Process according to claim 18, wherein the coupling agent consists of or contains a component A consisting of one or more sulphur-donating vulcanisation accelerators chosen from the group made up of a) thiuram polysulphides of formula

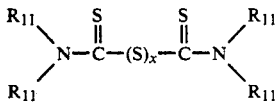

in which each of the $R_{11}$ units, which are identical or different, denotes a $C_1$-$C_{12}$ and preferably $C_1$-$C_8$ hydrocarbon radical, radical, or two radicals $R_{11}$ attached to the same nitrogen atom are linked together to form a $C_2$-$C_8$ divalent hydrocarbon radical and x is a number ranging from 2 to 8, b) alkylphenol disulphides.

23. Process according to claim 18, wherein the vulcanisation accelerator(s) which is(are) not a sulphur donor, capable of being employed to form the component C of the product N are chosen from the group made up of a) mercaptobenzothiazole and its derivatives, b) dithiocarbamates of formula

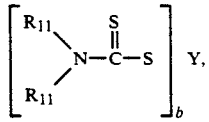

c) thiuram monosulphides of formula

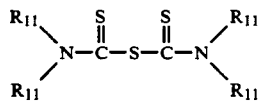

and d) the products comprising 1,3-diphenylguanidine, diortho-tolylguanidine and zinc oxide, this latter employed by itself or in the presence of fatty acids, with each of the $R_{12}$ units in the abovementioned formulae being identical or different and denoting a $C_1$-$C_{12}$ hydrocarbon radical, or else two radicals $R_{11}$ attached to the same nitrogen atom are joined together to form a $C_2$-$C_8$ hydrocarbon radical, Y denoting a metal and b denoting the valency Y.

24. Process according to one of claim 1 wherein the reaction mixture giving rise to the polymeric bitumen composition contains maleic anhydride in a quantity representing 0.05 to 0.5% by weight of the bitumen.

25. Bitumen/polymer composition exhibiting an adhesiveness which is retained on storage at elevated temperature, said composition containing a bitumen and, calculated on the weight of the bitumen, 0.5 to 15% of a polymer and 0.05 to 10% of an adhesion promoter consisting of one or more nitrogen compounds having a molecular mass higher than 90 and chosen from the group consisting of the derivatives of general formula R—Z—$R_1$ where R denotes a $C_3$-$C_{30}$ monovalent aliphatic hydrocarbon radical containing at least one unsaturated group, Z denotes a divalent group selected from the group consisting of:

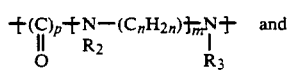 and

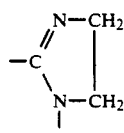

where n denotes an integer ranging from 2 to 6, m denotes zero or an integer ranging from 1 to 6, and p is equal to zero or 1, and each of $R_1$, $R_2$ and $R_3$, which are identical or different, denotes a hydrogen atom, a radical chosen from the radicals R, a $C_1$-$C_{18}$ alkyl, aminoalkyl or hydroxyalkyl radical or a radical —$(C_qH_{2q}O$—$)_r$—H radical with q denoting a number equal to 2 or 3 and r denoting an integer ranging from 2 to 10, and the corresponding salts and amine oxides, and wherein the nitrogen compound(s) constituting the adhesion promoter of the bitumen/polymer composition are grafted onto the polymer present in said composition.

26. Composition according to claim 25, wherein in formula R—Z—$R_1$ of the compounds forming the adhesion promoter, the radical R comprises a radical selected from the group consisting of an alkenyl, alkadienyl, alkatrienyl, alkatetraenyl and alkapentaenyl radical.

27. Composition according to claim 25 wherein in the formula R—Z—$R_1$ of the compounds forming the adhesion promoter, the radical R is $C_8$-$C_{20}$.

28. Composition according to claim 25, wherein the compound(s) forming the adhesion promoter are derivatives corresponding to either of the formulae

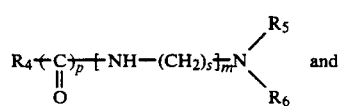 and

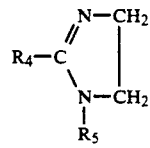

in which $R_4$ denotes a $C_8$-$C_{20}$ monovalent aliphatic hydrocarbon radical containing one or more unsaturations of the type >C=C<, each of the symbols $R_5$ and $R_6$, which are identical or different, denotes a hydrogen atom or a $C_1$-$C_8$ alkyl, aminoalkyl or hydroxyalkyl radical, p is equal to zero or 1, m denotes zero or an integer ranging from 1 to 6, and s is an integer ranging from 2 to 4.

29. Composition according to claim 1 wherein the bitumen which it contains has a penetration of between 5 and 500 according to French NF standard T 66004.

30. Composition according to claim 1 wherein the polymer which it contains is a random or block copolymer of styrene with a conjugated diene, the said diene being of the group consisting of butadiene, isoprene, chloroprene, carboxylated butadiene and carboxylated isoprene.

31. Composition according to claim 30, wherein the copolymer of styrene and conjugated diene has a weight content of styrene ranging from 15% to 40%.

32. Composition according to claim 30, wherein the copolymer has an average viscometric molecular mass of between 30,000 and 300,000.

33. Composition according to claim 1 wherein, characterised in that the polymer and adhesiphoric component contents of the composition represent 0.7 to 10% and 0.1 to 5% by weight of the bitumen respectively.

34. Composition according to claim 1 wherein it contains 1 to 30% based on the weight of the bitumen, of a flux agent, the said flux agent being a hydrocarbon oil exhibiting a distillation range at atmospheric pressure, determined according to ASTM standard D 86-67, of between 100° C. and 450° C.

35. Process for coating at least a portion of a road surface which comprises contacting said road surface with the bitumen/polymer composition obtained by the process of claim 1.

36. The process of claim 6 wherein the penetration is between 20 and 400.

37. The process of claim 9 wherein the viscometric mass is between 70,000 and 200,000.

38. The process of claim 18 wherein the weight ratio of component C to the product M ranges from 0.05 to 0.5.

39. The process of claim 19 wherein the sulphur is orthorhombic crystallized sulphur.

40. The process of claim 22 wherein the disulphides are selected from the group consisting of morpholine disulphide and N,N'-coprolactam disulphide.

41. The composition of claim 29 wherein the penetration is between 20 and 400.

42. The composition of claim 32 wherein the viscosmetric mass is between 70,000 and 200,000.

43. The composition of claim 33 wherein the distillation range is between 150° C. and 380° C.

* * * * *

UNITED STATES PATENT AND TRADEMARK OFFICE
CERTIFICATE OF CORRECTION

PATENT NO.   : 5,120,777
DATED        : June 9, 1992
INVENTOR(S)  : Pierre Chavrot, et. al.

It is certified that error appears in the above-indentified patent and that said Letters Patent is hereby corrected as shown below:

On the Title page, item [75], inventor: "Lyons" should read --Lyon--
Column 3, lines 55 and 56, delete "which are present in the bitumen/polymer composition".
Column 6, line 43, "corresponding" should read --correspond--.
Column 15, Claim 4, line 1, "or 4" should be deleted.
    Claim 6, line 1, "one of" should be deleted.
    Claim 7, line 1, "Processing" should read --Process-- and "one of" should be deleted.
    Claim 9, line 1, "in that" should be deleted.
Column 16, Claim 13, line 1, "clam" should read --claim--.
    Claim 20, line 1, "that" should be deleted.
Column 17, Claim 22, line 9, the word "radical", (second occurrence) should be deleted.
    Claim 23, line 13, "$R_{12}$" should read --$R_{11}$--.
    Claim 24, line 1, "one of" should be deleted.
Column 18, Claim 25, line 21, the word "radical" should be deleted.
Column 19, Claim 33, lines 1-2, "characterised in that" should be deleted.
Column 20, Claim 40, line 68, "coprolactam" should read --caprolactam--.

Signed and Sealed this

Nineteenth Day of October, 1993

Attest:

BRUCE LEHMAN

Attesting Officer                    Commissioner of Patents and Trademarks